(12) United States Patent
Seff et al.

(10) Patent No.: US 12,459,386 B2
(45) Date of Patent: Nov. 4, 2025

(54) DUAL PURPOSE POWER PEDESTAL

(71) Applicant: EATON INTELLIGENT POWER LIMITED, Dublin (IE)

(72) Inventors: Paul David Seff, Williamsburg, VA (US); Jonathan Turman, Quinton, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 226 days.

(21) Appl. No.: 18/209,072

(22) Filed: Jun. 13, 2023

(65) Prior Publication Data

US 2024/0416773 A1    Dec. 19, 2024

(51) Int. Cl.
*B60L 53/31*    (2019.01)
*B60L 53/16*    (2019.01)
*H02B 1/50*    (2006.01)

(52) U.S. Cl.
CPC .............. *B60L 53/31* (2019.02); *B60L 53/16* (2019.02); *H02B 1/50* (2013.01)

(58) Field of Classification Search
CPC ............ B60L 53/31; B60L 53/16; H02B 1/50
See application file for complete search history.

(56) References Cited

U.S. PATENT DOCUMENTS

2016/0229305 A1\* 8/2016 Shumaker ............. H04W 12/06
2023/0011288 A1\* 1/2023 Larsen ................... G06Q 50/06

\* cited by examiner

*Primary Examiner* — Pete T Lee
(74) *Attorney, Agent, or Firm* — Eckert Seamans Cherin & Mellott, LLC (57) ABSTRACT

A dual purpose power pedestal includes a housing having a base, a body extending upwardly from the base, and a top disposed opposite the base, the body including a first side and a second side; a recreational vehicle (RV) connection mechanism disposed on the first side of the body and comprising a power receptacle and a first circuit interrupter, the RV connection mechanism being structured to be coupled to a power source and provide power to at least an RV; and an electric vehicle (EV) connection mechanism disposed on the second side of the body and comprising at least a frame, an EV connector, an EV cable, and an EV charger that is disposed within the frame and includes at least a controller and a second circuit interrupter, the EV charger being structured to charge an EV based on a signal from the controller.

18 Claims, 10 Drawing Sheets

DUAL PURPOSE POWER PEDESTAL

FIELD OF THE INVENTION

The disclosed concept relates generally to power pedestals, and in particular, to dual purpose power pedestals for providing power output therefrom to recreational vehicles (RVs) and electric vehicles (EVs).

BACKGROUND OF THE INVENTION

Power pedestals are free-standing outdoor electrical enclosure and include an upstanding housing, the base of which is disposed on a dock, a pier, or any other suitable foundation (e.g., without limitation, a marine platform, an RV park, etc.), and is structured to receive, for example and without limitation, power cables, telephone lines, television cables, Internet service lines, and water service lines. The housing is made from a weather-resistant material, such as a suitable plastic or metal (e.g., without limitation, stainless steel, thermoset, etc.), and is designed to enclose the cables and lines and the electrical components, receptacles and connectors which are electrically connected to the lines, in order to shield and protect them from the environment. Accordingly, power pedestals are well suited for use in environments such as marinas and RV parks, where they must remain outdoors exposed to environmental elements as they serve to provide plug-in power and/or connectivity (e.g., without limitation, telephone service; Internet service; cable television; water service), for example, for boats and RVs and other vehicles. Some power pedestals are known to employ electricity meters that measure and display power or energy consumption. With the development of electric vehicle technology, the number of EVs including electric automobiles and vessels is growing rapidly, increasing the demand for EV charging capabilities. However, conventional power pedestals do not have means for EV connection for charging, e.g., without limitation, land-based EVs. Further, typical EV chargers have larger dimensions than those of the power pedestals. As such, an additional power pedestal dedicated for EV charging or a separate EV charging station (EVSE) needs to be installed in marinas or RV parks for charging EVs, thereby significantly increasing installation and labor costs.

There is a room for improved power pedestals.

SUMMARY OF THE INVENTION

A dual purpose power pedestal is provided. The dual purpose power pedestal includes a housing including a base structured to be coupled to a platform, a body extending upwardly from the base, and a top disposed opposite the base, the body including a first side and a second side; a recreational vehicle (RV) connection mechanism disposed on the first side of the body of the housing and comprising at least a power receptacle and a first circuit interrupter, the RV connection mechanism being structured to be coupled to a power source and provide power to at least an RV upon connecting the RV to the power receptacle via an RV cable; and an electric vehicle (RV) connection mechanism disposed on the second side of the body and comprising at least a frame, an EV connector, an EV cable, and an EV charger that is disposed within the frame and includes at least a controller and a second circuit interrupter, the EV charger being structured to charge an EV based on a signal from the controller upon connecting the EV connector to the EV.

Another example embodiment provides an EV connection mechanism for use in a power pedestal having an RV connection mechanism disposed on one side of a housing thereof for providing power to an RV. The EV connection mechanism includes a frame having a base and a cover pivotably attached to one end of the base; an EV connector; and EV cable coupled to the EV connector; and an EV charger. The EV charger includes charging system includes a connector and a charging cable, and an EV charger coupled to a power source and the charging cable. The EV charger includes at least a circuit interrupter, a controller, input terminals and output terminals. The EV charger is structured to be coupled to a power source and provide power for charging an EV based on a signal from the controller upon connecting the EV connector to the EV. The base of the frame is structured to be attached to external surface of another side of the housing of the power pedestal.

A system for providing power from a power pedestal. The system comprises an RV, an EV and a dual purpose power pedestal. The dual purpose power pedestal includes a housing including a base disposed on a platform, a body extending upwardly from the base, and a top disposed opposite the base, the body including a first side and a second side; an RV connection mechanism disposed on the first side of the body of the housing and comprising at least a power receptacle and a first circuit interrupter, the RV connection mechanism being coupled to a power source and structured to provide power to the RV upon connecting the RV to the power receptacle via an RV cable; and an EV connection mechanism disposed on the second side of the body and comprising at least a frame, an EV connector, an EV cable coupled to the EV connector, and an EV charger that is disposed within the frame and includes at least a second circuit interrupter, a controller, input terminals and output terminals, the EV charger being coupled to the power source via the input terminals and structured to charge the EV via the output terminals based on a signal from the controller upon connecting the EV connector to the EV.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "pedestal" or "pedestal member" shall mean an elongated, generally upright structure.

As employed herein, the term "power pedestal" refers to a pedestal or pedestal member structured to enclose electrical components (e.g., without limitation, contactors; circuit breakers; electric meters; transformers; light fixtures; power receptacles; telephones; telephone and/or Internet service lines and electrical connectors therefor; television cables and electrical connectors therefor), and to input power from input power terminals (e.g., without limitation, utility power terminals) and output power to a number of output power receptacles. The power pedestal thus provides a power center for providing plug-in power and/or connectivity (e.g., without limitation, telephone service; Internet service; cable television; water service), for example, for a vehicle, such as for example and without limitation, a watercraft, such as a boat, wherein the power pedestal is disposed at or about a body of water (e.g., without limitation, a suitable platform in a marina), or for a land-based vehicle such as, for example and without limitation, wherein the power pedestal is disposed on a suitable land-based foundation (e.g., without limitation, a suitable platform in a camp ground).

As employed herein, the term "platform" shall mean a horizontal flat surface, a raised horizontal flat surface, or a dock (e.g., without limitation, a floating dock; a stationary dock; a pier).

As employed herein, the term "vehicle" shall include land-based vehicles such as, for example and without limitation, automobiles, cars, trucks, station wagons, sport-utility vehicles (SUVs), recreational vehicles (RVs), vans, hybrid vehicles, buses, campers, or trailers, and marine vehicles such as, for example and without limitation, any water-based vehicles, ships, boats, other vessels for travel on water, submarines, or other vessels for travel under water.

As employed herein, the term "electrical connector" refers to any known or suitable mechanism for providing an electrical connection between two electrical components and shall expressly include, but not be limited to, plugs, receptacles and terminals.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

Figure 1:
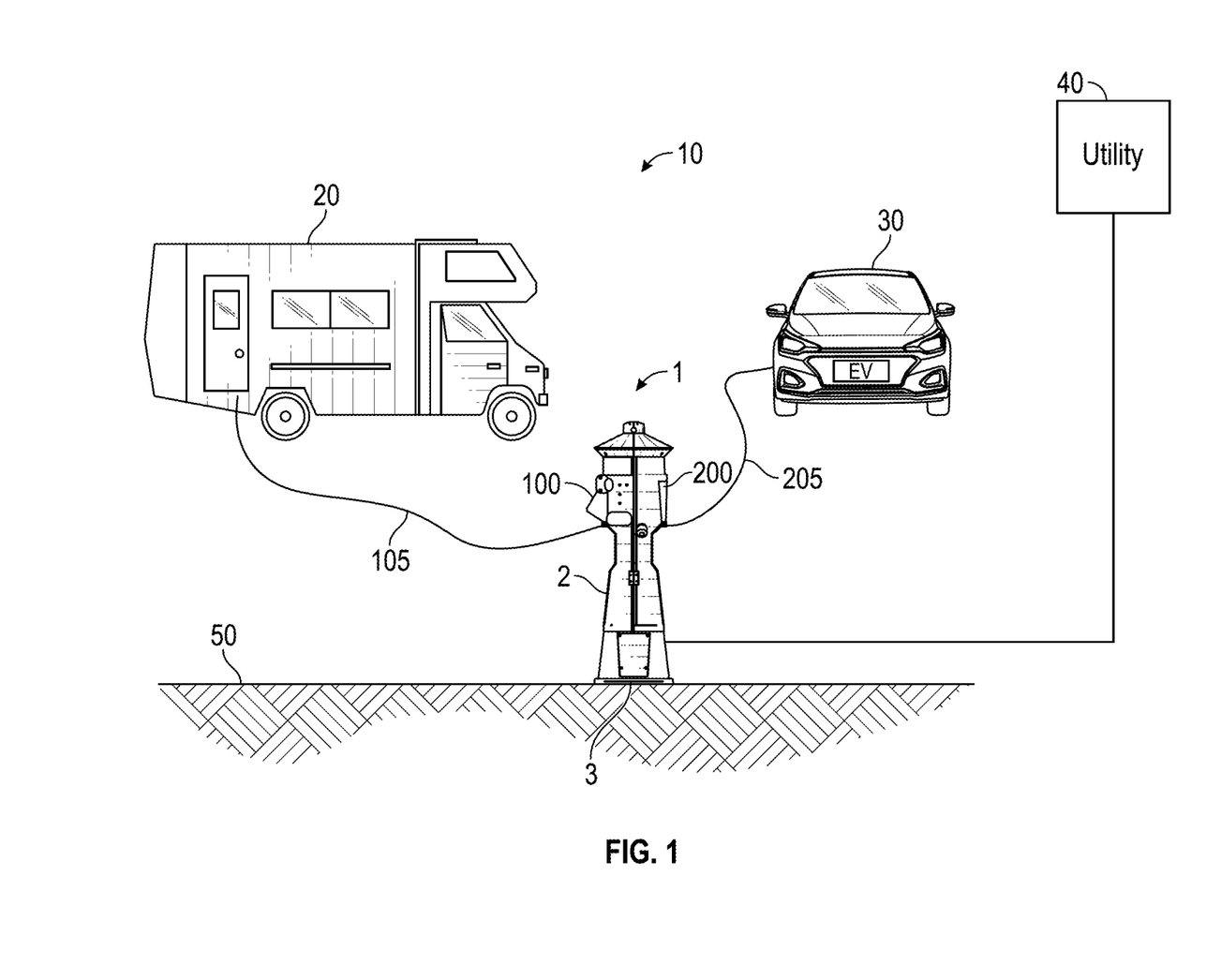
FIG. 1 illustrates a system for providing power to a recreational vehicle (RV) and charging an electric vehicle (EV) in an RV park using a dual purpose power pedestal in accordance with a non-limiting embodiment of the disclosed concept.

FIG. 1 illustrates a system 10 for providing power to a recreational vehicle (RV) 20 and an electric vehicle (EV) 30 in an RV park using a dual purpose power pedestal 1 in accordance with a non-limiting, example embodiment of the disclosed concept. The term "RV" as used herein refers to a recreational vehicle in general, including a land-based recreational vehicle and a marine or water-based recreational vehicle. The term "EV" as used herein refers to an electric vehicle including a land-based electric vehicle and a water-based electric vessel. In FIG. 1, the RV 20 is a motor vehicle or trailer having living amenities and the EV 30 is an electric automobile. The dual purpose power pedestal 1 is disposed in a platform (e.g., without limitation, a flat surface in the RV park) 50 and coupled to an AC power source (e.g., without limitation, utility grid) 40, the RV 20 and the EV 30. It supplies power to the RV 20 via an RV cable 105 and the EV 30 via an EV cable 205. The dual purpose power pedestal 1 and the components thereof are discussed further in detail with reference FIGS. 3A-J.

Figure 2:
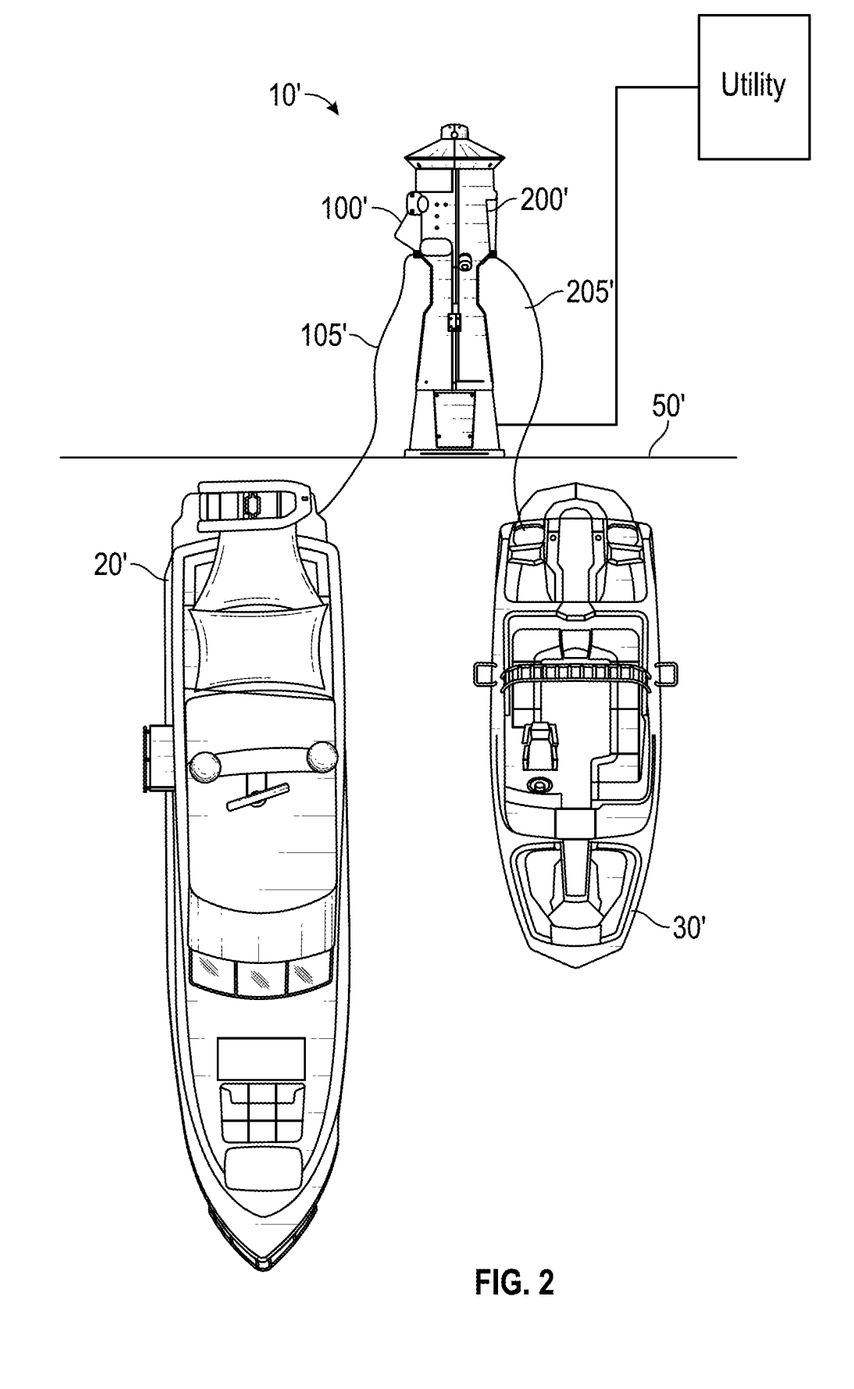
FIG. 2 illustrates a system for providing power to an RV and charging an EV using a dual purpose power pedestal in marina in accordance with a non-limiting embodiment of the disclosed concept.

FIG. 2 illustrates a system 10' for providing power to an RV 20' and an EV 30' using the dual purpose power pedestal 1 in marina in accordance with a non-limiting, example embodiment of the disclosed concept. The RV 20' is a recreational or housing vessel including living amenities, e.g., without limitation, a kitchen, a bathroom, and a sleeping quarters. The EV 30' is an electric vessel including a battery for propulsion. The dual purpose power pedestal 1 is disposed on a platform 50' in the marina and coupled to an AC power source (e.g., without limitation, utility) 40. The platform 50' may be e.g., without limitation, a dock pier. The dual purpose power pedestal 1 provides power to the RV 20' and support equipment via the RV cable 105' and the battery for propulsion to the EV 30' via the EV cable 205'.

Figure 3A:
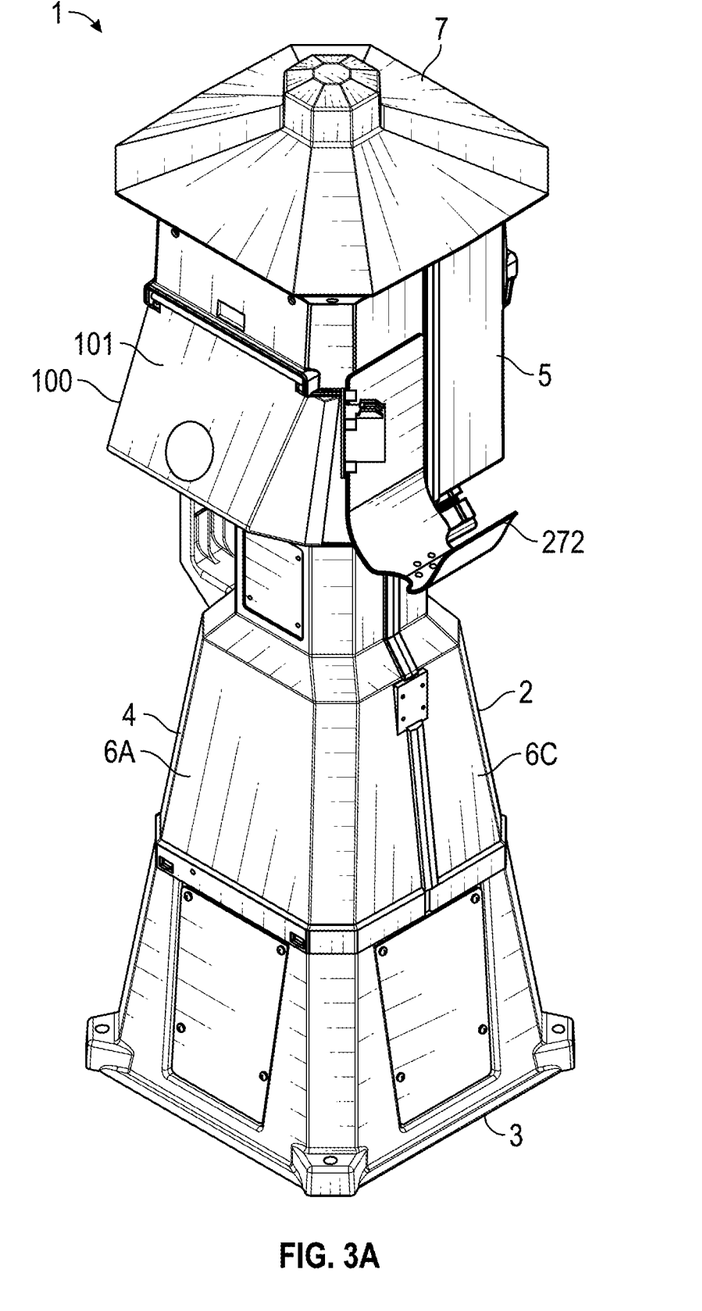
FIG. 3A is a top perspective view of a dual purpose power pedestal in accordance with a non-limiting embodiment of the disclosed concept. The dual purpose power pedestal includes an RV connection mechanism on an upper portion of a first side thereof.
Figure 3B:
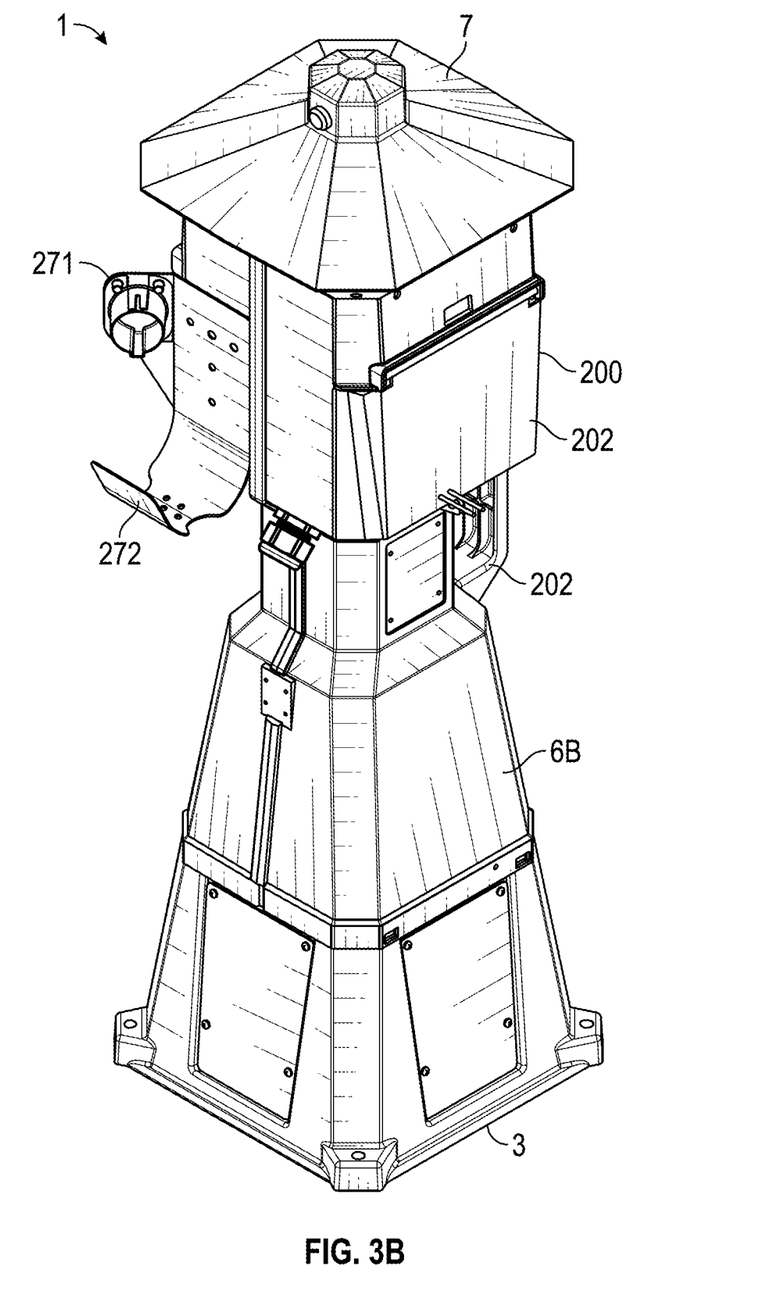
FIG. 3B is a top perspective view of a dual purpose power pedestal in accordance with a non-limiting embodiment of the disclosed concept. The dual purpose power pedestal includes an EV connection mechanism on an upper portion of a second side thereof.
Figure 3C:
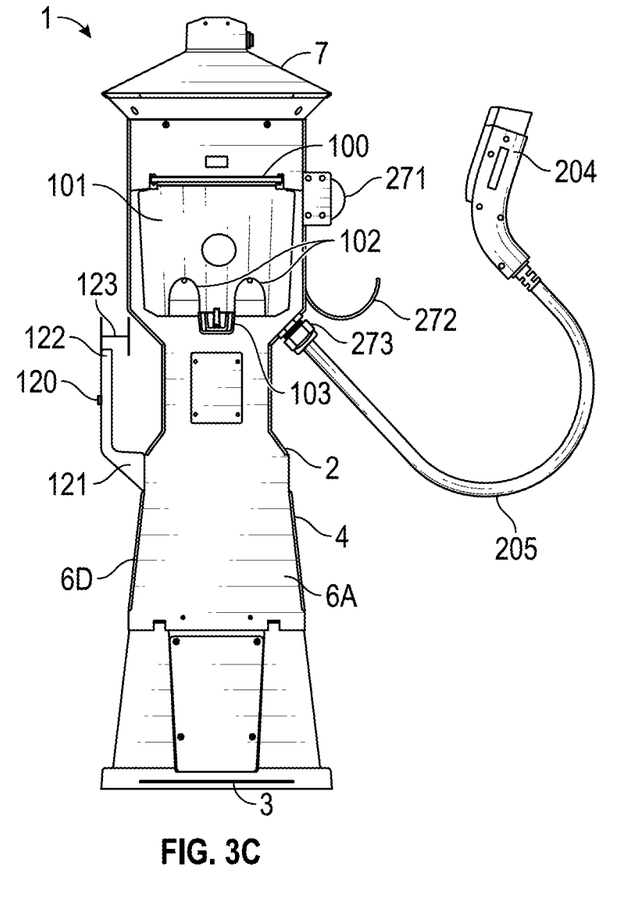
FIG. 3C is an elevation view of a dual purpose power pedestal in accordance with a non-limiting embodiment of the disclosed concept. The dual purpose power pedestal includes an RV connection mechanism on an upper portion of a first side thereof.
Figure 3D:
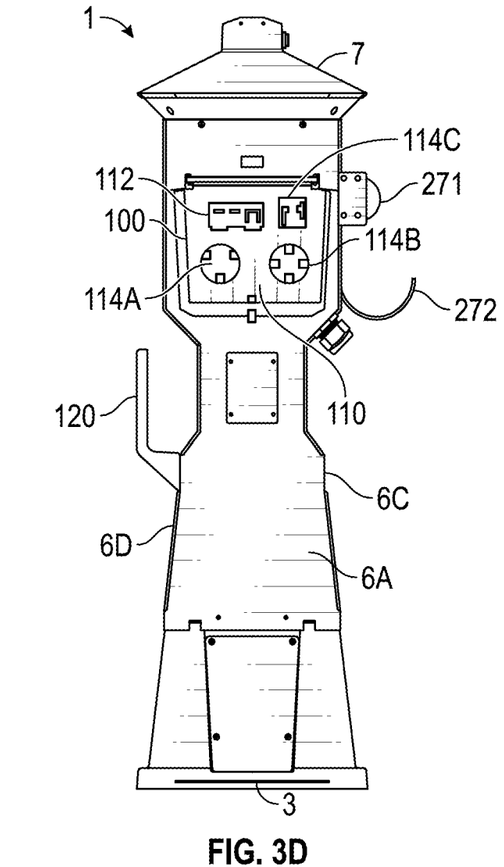
FIG. 3D is an elevation view of a dual purpose power pedestal in accordance with a non-limiting embodiment of the disclosed concept. The dual purpose power pedestal includes an RV connection mechanism on an upper portion of a first side thereof. The view illustrates the RV connection mechanism with a cover for the RV connection mechanism removed.
Figure 3E:
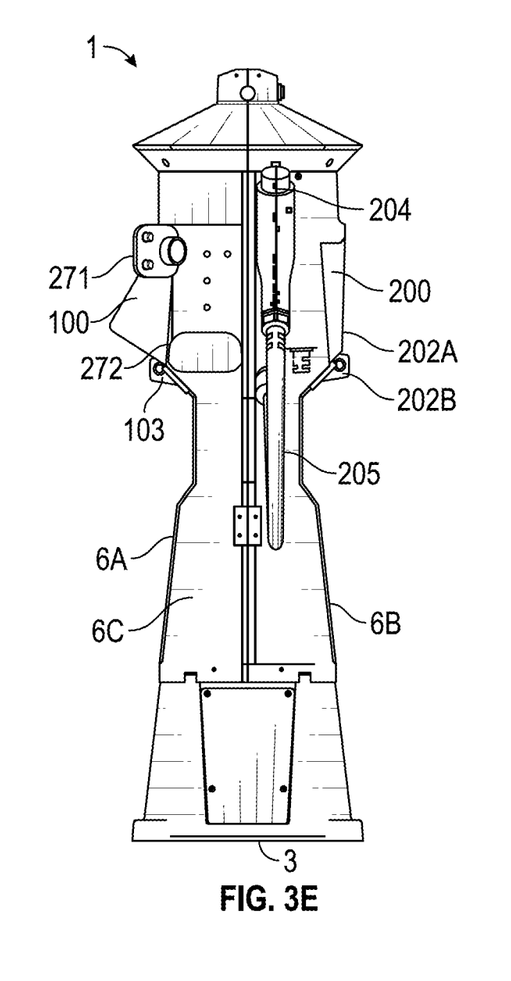
FIG. 3E is an elevation view of a front of a dual purpose power pedestal in accordance with a non-limiting embodiment of the disclosed concept.
Figure 3F:
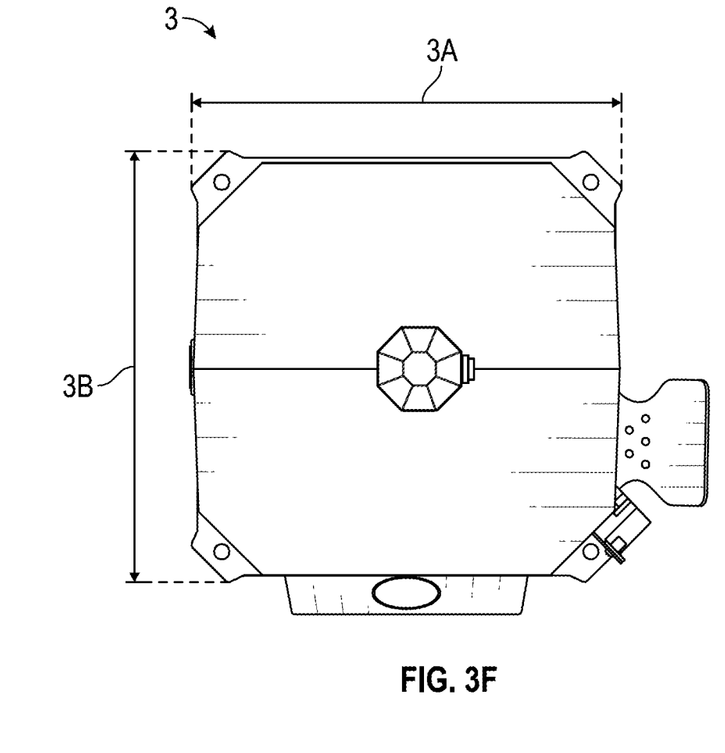
FIG. 3F is a view of a bottom of a dual purpose power pedestal in accordance with a non-limiting embodiment of the disclosed concept.
Figure 3G:
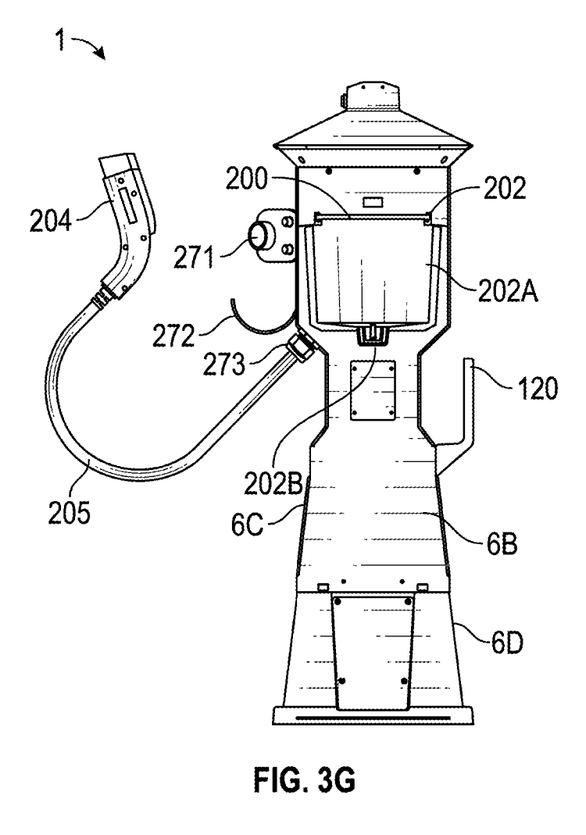
FIG. 3G is an elevation view of a dual purpose power pedestal in accordance with a non-limiting embodiment of the disclosed concept. The dual purpose power pedestal includes an EV connection mechanism on an upper portion of a second side thereof.
Figure 3H:
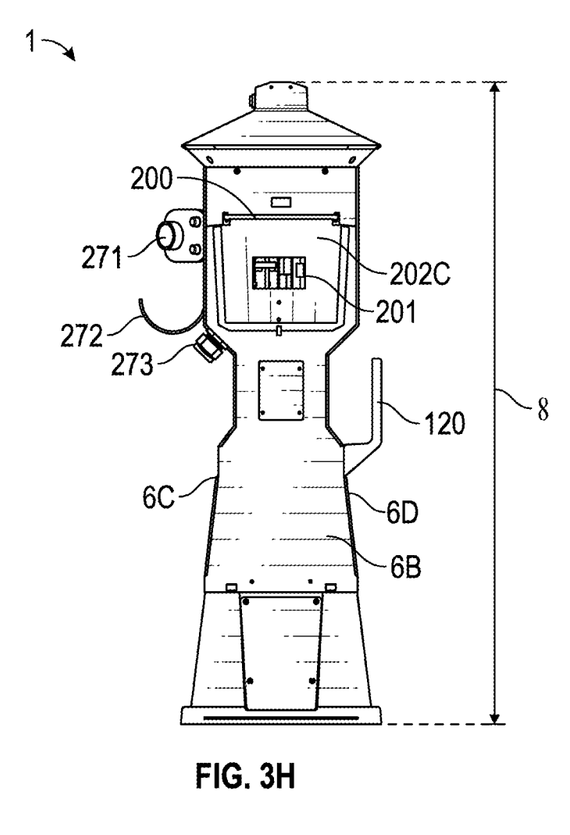
FIG. 3H is an elevation view of a dual purpose power pedestal in accordance with a non-limiting embodiment of the disclosed concept. The dual purpose power pedestal includes an EV connection mechanism on an upper portion of a second side thereof. The view illustrates an EV connection mechanism with a cover for the EV connection mechanism removed.
Figure 3I:
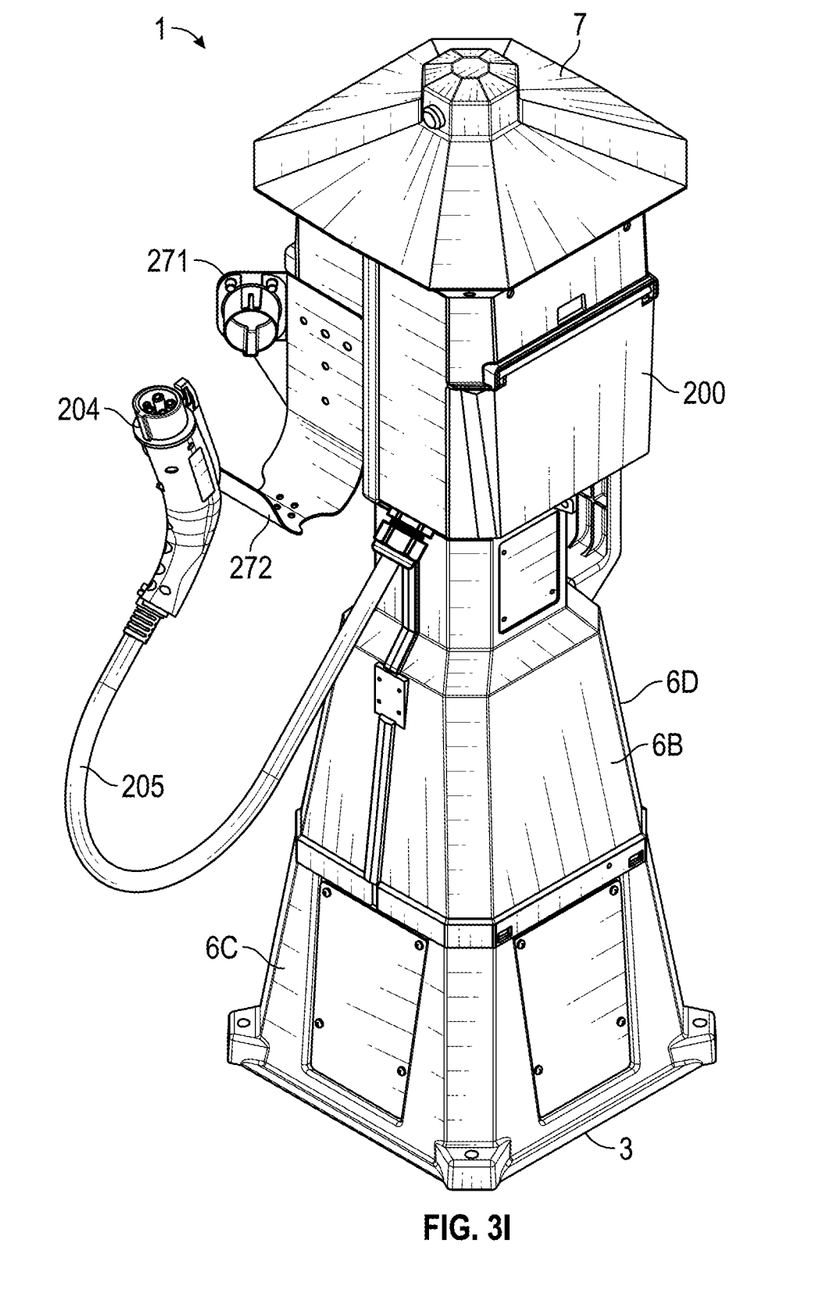
FIG. 3I is a perspective view of a dual purpose power pedestal in accordance with a non-limiting embodiment of the disclosed concept. The view illustrates an EV connection mechanism and cable management system thereof.
Figure 3J:
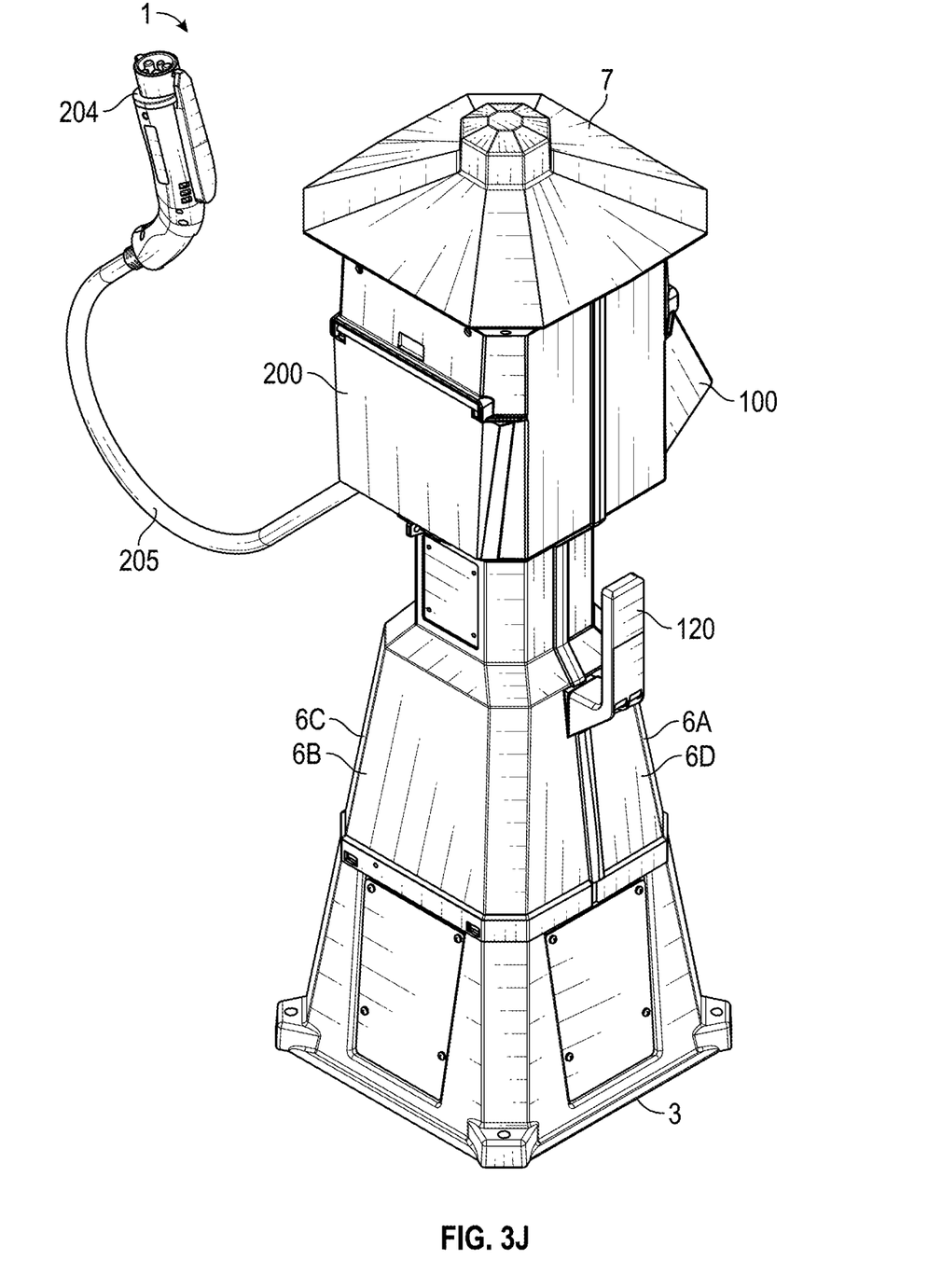
FIG. 3J is a perspective view of a dual purpose power pedestal in accordance with a non-limiting embodiment of the disclosed concept.

FIGS. 3A-J illustrate various views of the dual purpose power pedestal 1 of FIGS. 1 and 2. The dual purpose power pedestal 1 is a listed UL power outlet pedestals. It includes a housing 2 having a base 3 structured to be coupled to the platform 50,50', a body 4 extending upwardly from the base 3, and a top 7 disposed opposite the base 3. The base 3 is further structured to receive, for example and without limitation, power cables, telephone lines, television cables, Internet service lines, and water service lines. The body 4 includes a first side 6A and a second side 6B. An RV connection mechanism is disposed on the first side 6A of the body 4 and an EV connection mechanism 200 is disposed on the second side 6B of the body 4. While FIGS. 1-3J illustrate the housing 2 having four sides 6A-D, it is to be understood that the housing 2 may have a more or less number of sides as appropriate without departing from the scope of the disclosed concept. The housing 2 may have a height 8 of, e.g., without limitation, approximately 111.20 cm (43.78 inches). The base 3 may have a substantially rectangular shape (as shown in FIG. 3F) having a width 3A of, e.g., without limitation, approximately 34.70 cm (13.66 inches) and a depth 3B of, e.g., without limitation, approximately 34.65 cm (13.64 inches). The shapes and dimensions of the housing 2 are for illustrative purposes only, and thus may vary depending on the circumstances and needs without departing from the scope of the disclosed concept. The top 7 is disposed on top of an upper portion 5 of the body 2. The housing 2 may also include a cable management system. The cable management system may include an RV cable management system and an EV cable management system. Each cable management system is discussed further in detail with reference to respective connection mechanism.

As shown in FIGS. 1, 2, 3A 3C-E and 3J, the RV connection mechanism 100 is disposed on an upper portion of the first side 6A of the dual purpose power pedestal 1. It includes a cover 101 (as shown in FIGS. 3A and 3C) and a receptacle panel 110 (as shown in FIG. 3D). The cover 101 is pivotably attached to a top edge of the receptacle panel 110, which may be mounted on the upper portion of the first side 6A. Optionally, the RV connection mechanism 100 may include a frame attached to the upper portion of the first side 6A, the frame having the cover 101 pivotably attached to a top edge thereof. The cover 101 also has apertures 102 via which the RV cable 105,105' passes when the RV connection mechanism 100 is coupled to the RV 20,20'. The cover 101 has a tab 103 via which the user opens the cover 101 and accesses the receptacle panel 110. FIG. 3D illustrates the RV connection mechanism 100 with the cover 101 having been removed. In FIG. 3D, the receptacle panel 110 includes a circuit interrupter 112 and power receptacles 114. The circuit interrupter 110 may include one or more circuit breakers such as ground fault circuit interrupters that provide ground fault protection for the power receptacle 114 or other appropriate types of circuit interrupters. The power receptacle 114 may include a 30A 120V three-wire receptacle 114A for a smaller RV and a 50A 120V/240V four-wire receptacle 114B for a larger RV. Depending on the size and needs of the RV 20,20', the user may plug-in the RV cable 105, 105' to the appropriate power receptacles 114A,B to supply power to the RV 20,20' and support equipment such as a refrigerator, A/C, or television therein. Optionally, the power receptacle 114 may also include a 20A 120V convenience receptacle 114C.

The RV connection mechanism 100 may also have an RV cable management system including, e.g., without limitation, a holder 120 for the RV cable 105, 105'. The holder 120 may be disposed proximate to the RV connection mechanism and attached to a portion of external surface of the body 4 of the housing 2. For example, the holder 120 may be disposed, e.g., without limitation, at a middle portion of the fourth side 6D of the housing 2 (as shown in FIGS. 3C, D, G, H and J). The fourth side 6D may be either the front or back of the housing 2 of the dual purpose power pedestal. In FIGS. 3C, D, G, H and J, the holder 120 has one end 121 attached to the middle portion of the fourth side 6D and a distal end 122 extending outwardly and vertically from the one end 121. The distal end 122 is disposed laterally apart (e.g., without limitation, by a distance 123 of approximately 3.96 cm) from the external surface of the upper portion of the fourth side 6D so as to provide a sufficient room for the user to easily wind the RV cable 105,105' around the holder 120 when the RV 20,20' is not connected to the power receptacle 114. The location of the holder 120 in FIGS. 3C, D, G, H and J is for illustrative purposes only, and it is to be understood that the holder 120 may be disposed at any other location convenient to the user without departing from the scope of the disclosed concept.

Optionally, the RV connection mechanism 100 may also include a metering device coupled to the utility power line and structured to measure energy consumed by the RV 20,20' and/or support equipment thereof. Optionally, the RV connection mechanism system 100 may also include a display structured to display the RV information, the metering information, the temporal information, or the environmental conditions (e.g., without limitation, weather) and so forth. Optionally, the RV connection mechanism system 100 may be communicatively coupled to an external device, e.g., without information, a user device, to transmit data including the displayed information.

As shown in FIGS. 1, 2, 3B, 3E, and 3G-I, the EV connection mechanism 200 is disposed on an upper portion of the second side 6B of the dual purpose power pedestal 1. The EV connection mechanism 200 includes an EV charger 201, a frame 202, an EV connector 204, an EV cable 205, and an EV cable management system. The EV charger 201 may be an EV charging circuit breaker that has both EV charging function and circuit protection function. An example EV charging circuit breaker is described in detail in U.S. Pat. No. 11,173,796B2 to Zhong et al. The EV charger 201 is described further with reference to FIG. 4. The frame 202 includes a base 202C and a cover 202A pivotably attached to a top edge of the base 202C. The cover 202A has a tab 202B via which the user can open or close the cover 202A. The frame 202 may be of weather resistant material, e.g., stainless steel or thermoset. Optionally, the EV charging connection mechanism 200 may not include a frame, but include an EV charging assembly that has a cover 202, an EV connector 204, an EV cable 205 and an EV charger 201 structured to be coupled to, e.g., without limitations, power cables and lines. The EV connector 204 is a J1772 connector (i.e., an adaptor, connector, coupler, etc. compliant with Society of Automotive Engineers J1772 standards for EV charging). The EV cable 205 is an EV charging cord compliant with the applicable standards, e.g., without limitation, its length not exceeding 7.5 m. Optionally, the EV connection mechanism 200 may be removably attached to the upper portion of the second side 6B for easy and simple retrofitting of the existing power pedestals. For example, external surface of the base 202C may be attached (e.g., mounted or bolted by a connecting mechanism such as a screws) to the upper portion of the second side 6B of the dual purpose power pedestal 1. The power lines may then be coupled to the input terminals (e.g., without limitation, the input terminals 214,215 of FIG. 4).

The EV cable management system may include a non-charging receptacle 271, a cable holster 272 and a bushing 273. The EV cable management system may be disposed proximate to the EV connection mechanism 200 and attached to a portion of external surface of the body 4 of the housing 2. For example, as illustrated in FIGS. 3A-E and G-I, the non-charging receptacle 271, the cable holder 272 and the bushing 273 may be disposed on external surface of the third side 6C of the dual purpose power pedestal 1. The third side 6C may be disposed opposite the fourth side 6D. However, the location of the EV cable management system in FIGS. 3A-E and G-I is for illustrative purposes only, and thus it will be understood that the EV cable management system may be disposed at any other location convenient for the user without departing from the scope of the disclosed concept. The non-charging receptacle 271 may be a plug-in for the EV connector 204 and is structured to receive and hold the EV connector 204 while the EV connector 204 is not connected to the EV 30,30' so as to protect the EV connector 204 from its environment. The cable holster 272 may be, e.g., without limitation, a hook or a holder structured to hold the EV cable 205 while the EV connector 204 is plugged into the non-charging receptacle 271. The bushing 273 may be disposed adjacent to the cable holster 272 and the EV cable 205 is connected to the EV charger 201 via the bushing 273.

Figure 4:
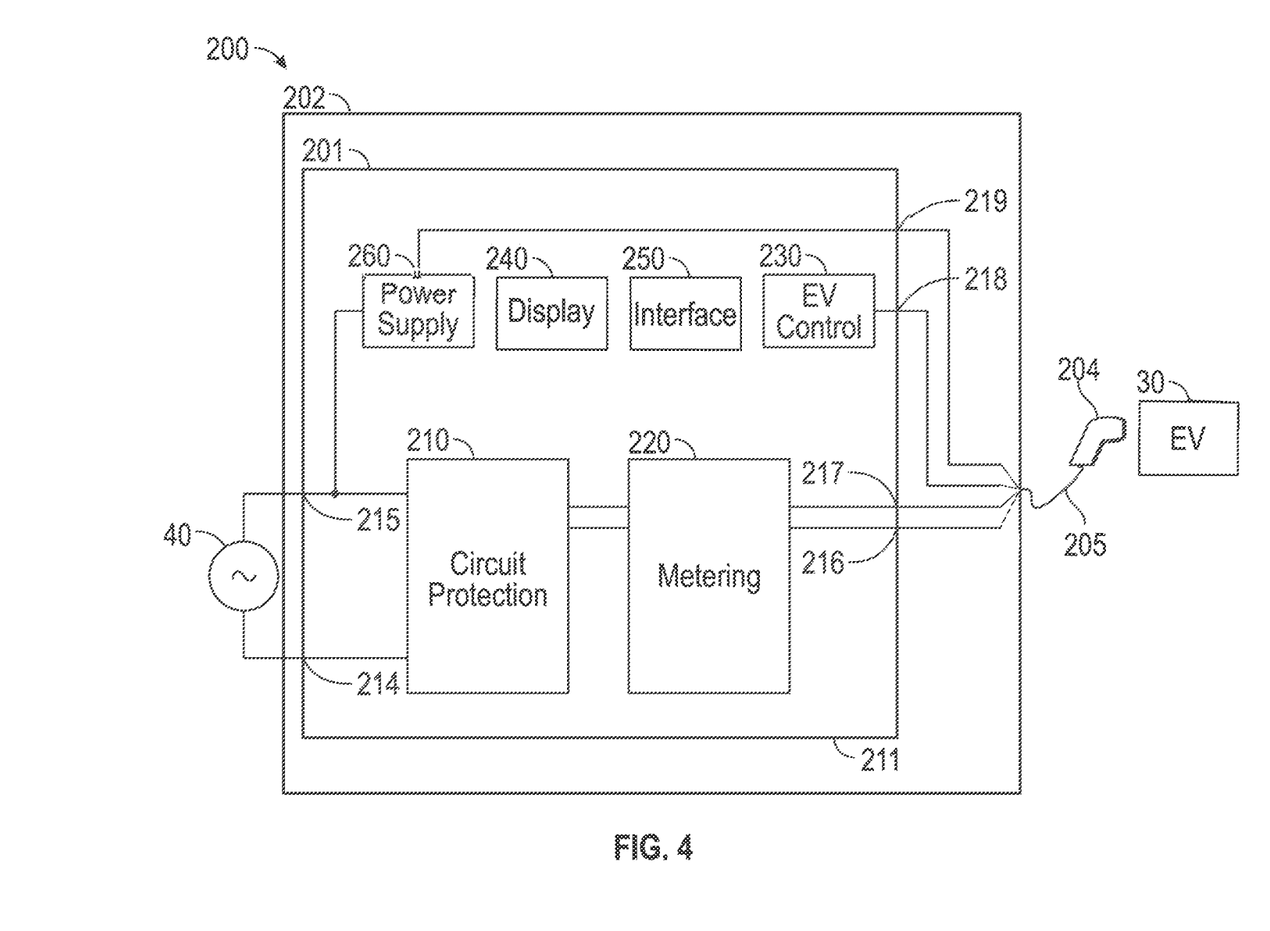
FIG. 4 illustrates an EV connection mechanism of a dual purpose power pedestal in accordance with a non-limiting embodiment of the disclosed concept.

In some examples, the EV connection mechanism 200 may be capable of wirelessly communicating with an external device via the interface unit 250 (as shown in FIG. 4) to display, e.g., metering information, charging status, etc., and provide the alarm to the user in a fault event.

As shown in FIG. 4, the EV charger 201 is disposed within the frame 202 of the EV connection mechanism 200. The EV charger 201 may include at least a circuit interrupter 210, a controller 230, input terminals 214,215 and output terminals 216-219 that include power lines and communication lines. The EV charger 201 is structured to be coupled to the power source 40 via the input terminals 214,215 and provide power for charging the EV 30,30' via the output terminals 216,217. The output terminal 218 provides a pilot signal, e.g., without limitation, a J1772 compliant pilot signal. The output terminal 219 provides DC power used in EV charging process. The output terminals 216-219 further communicate the status (e.g., without limitation, charging, stopped charging, etc.) of the EV charger 201. The EV charger 201 may further include a housing 211, a metering unit 220, a display unit 240, an interface unit 250, and a power supply unit 260.

The circuit interrupter 210 includes primary separable contacts (not shown) structured to be coupled to the input terminals 214,215 and the power lines of the output terminals 216,217. The circuit interrupter 210 is structured to detect a fault (e.g., without limitation, overcurrent, etc.) and to trip open primary separable contacts upon detecting the fault. The circuit interrupter 210 may also include secondary separable contacts (not shown) structured to at least start or stop charging the EV 30.30' based on a signal from the controller 230. The circuit interrupter 210 may also include a ground fault detector (not shown) to detect a ground fault and trip the secondary separable contacts in response to the detected ground fault. The metering unit 220 is structured to sense current and voltage, meter characteristics of the power process (e.g., without limitation, magnitude of current, voltage, phase, total power, etc.), and output data indicative of the metered characteristics of the power flowing between the input terminals 214,215 and the output terminals 216,217. The controller 230 is structured to generate pilot signal provided to the output terminal 218 and provides control signal to start or stop charging the EV 30,30'. The display unit 240 is coupled to at least the metering unit 220 and the controller 230, and structured to display the data indicative of the metered power characteristics and the status of EV charging. The display unit 240 may include a primary display unit (e.g., without limitation, OLED display) and a secondary display unit (e.g., without limitation, LED indicators). The interface unit 250 is structured to at least provide an interface between the metering unit 220 and an external device (e.g., without limitation, a computer) to allow the external device to read information output by the metering unit 220. In some examples, the interface unit 250 may also provide an alarm function. The power supply unit 260 is structured to convert power received from the power source 40 and to provide the power to the various components in the EV connection mechanism 200.

Therefore, the dual purpose power pedestal 1 according to the disclosed concept provides both EV charging capability and conventional RV powering capability in a single power pedestal. Utilizing the existing form factors of the conventional power pedestals, the dual purpose power pedestal 1 provides multiple types of power delivery with one side of the dual purpose power pedestal 1 dedicated to the RV powering and another side dedicated to the EV charging. This allows for offering additional means of power delivery without requiring installation of additional pedestals. Further, the dual purpose power pedestal 1 allows for providing power to the RV 20,20' and the EV 30,30' simultaneously or one at a time. Simultaneous charging does not result in a slower charging time as compared to when only one of the RV 20,20' or the EV 30,30' is being charged because the dual purpose power pedestal 1 allows both RV connection mechanism 100 and the EV connection mechanism 200 to draw and provide power at respective maximum power capacity at any time. Further, by incorporating the EV charger 201 within the EV connection mechanism 200, the dual purpose power pedestal 1 not only dispenses with a need for installing additional power pedestals for EV charging, but also allows for a simple and easy retrofitting of the existing power pedestals with dual RV and EV power delivery capabilities.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:
1. A dual purpose power pedestal, comprising:
a housing including a base structured to be coupled to a platform, a body extending upwardly from the base, and a top disposed opposite the base, the body including a first side and a second side;
a recreational vehicle (RV) connection mechanism disposed on the first side of the body and comprising at least a power receptacle and a first circuit interrupter, the RV connection mechanism being structured to be coupled to a power source and provide power to at least an RV upon connecting the RV to the power receptacle via an RV cable;
an electric vehicle (EV) connection mechanism disposed on the second side of the body and comprising at least a frame, an EV connector, an EV cable, and an EV charger that is disposed within the frame and includes at least a controller and a second circuit interrupter, the

EV charger being structured to charge an EV based on a signal from the controller upon connecting the EV connector to the EV; and a cable management system that includes an RV cable management system and an EV cable management system.

2. The dual purpose power pedestal of claim 1, wherein the first circuit interrupter is structured to be coupled to the power source and interrupt current from flowing to the RV in an event of fault.

3. The dual purpose power pedestal of claim 1, wherein the EV charger further comprises input terminals and output terminals including power lines and communication lines, the EV charger being structured to be coupled to the power source via the input terminals and charge the EV via the EV connector connected to the output terminals.

4. The dual purpose power pedestal of claim 3, wherein the second circuit interrupter comprises primary separable contacts structured to be coupled to the input terminals and the power lines of the output terminals, and wherein the second circuit interrupter is structured to detect a fault and trip open the primary separable contacts upon detecting the fault.

5. The dual purpose power pedestal of claim 4, wherein the second circuit interrupter further comprises secondary separable contacts structured to at least start or stop charging the EV based on the signal from the controller.

6. The dual purpose power pedestal of claim 1, wherein the EV cable management system is disposed proximate to the EV connection mechanism and attached to a portion of an external surface of the body, and wherein the EV cable management system comprises at least a non-charging receptable structured to receive the EV connector and a cable holster structured to hold the EV cable when the EV connector is not connected to the EV.

7. The dual purpose power pedestal of claim 6, wherein the RV cable management system is disposed proximate to the RV connection mechanism and attached to another portion of the external surface of the body, and wherein the RV cable management system comprises at least a cable holder structured to hold the RV cable when the RV is not connected to the RV connection mechanism.

8. The dual purpose power pedestal of claim 1, wherein the EV connector comprises a J1772 connector for EV charging.

9. The dual purpose power pedestal of claim 1, wherein the platform comprises a marina or an RV park.

10. The dual purpose power pedestal of claim 1, wherein the EV comprises a land-based EV or a water-based EV.

11. An electric vehicle (EV) connection mechanism for use in a power pedestal having a recreational vehicle (RV) connection mechanism disposed on one side of a housing of the power pedestal for providing power to an RV, the EV connection mechanism comprising:

a frame having a base and a cover pivotably attached to one end of the base;

an EV connector;

an EV cable coupled to the EV connector; and an EV charger that includes at least a circuit interrupter, a controller, input terminals and output terminals, the EV charger being structured to be coupled to a power source and charge an EV based on a signal from the controller upon connecting the EV connector to the EV, the circuit interrupter being structured to interrupt current flowing from the power source and the EV upon detecting a fault within the EV charger, wherein the base of the frame is structured to be attached to an external surface of another side of the housing of the power pedestal.

12. A system for providing power from a power pedestal, comprising:

a recreational vehicle (RV);

an electric vehicle (EV);

a dual purpose power pedestal comprising:

a housing including a base disposed on a platform, a body extending upwardly from the base, and a top disposed opposite the base, the body including a first side and a second side;

a recreational vehicle (RV) connection mechanism disposed on the first side of the body and comprising at least a power receptacle and a first circuit interrupter, the RV connection mechanism being coupled to a power source and structured to provide power to the RV upon connecting the RV to the power receptacle via an RV cable; and an electric vehicle (EV) connection mechanism disposed on the second side of the body and comprising at least a frame, an EV connector, an EV cable coupled to the EV connector, and an EV charger that is disposed within the frame and includes at least a second circuit interrupter, a controller, input terminals and output terminals, the EV charger being coupled to the power source via the input terminals and structured to charge the EV via the EV connector based on a signal from the controller upon connecting the EV connector to the EV; and a cable management system including an RV cable management system and an EV cable management system.

13. The system of claim 12, wherein the first circuit interrupter is coupled to the power source and structured to interrupt current from flowing to the RV in an event of a fault.

14. The system of claim 12, wherein the second circuit interrupter comprises primary separable contacts structured to be coupled to the input terminals and power lines of the output terminals, and wherein the second circuit interrupter is structured to detect a fault and trip open the primary separable contacts upon detecting the fault.

15. The system of claim 12, wherein the second circuit interrupter further comprises secondary separable contacts structured to at least start or stop charging the EV based on the signal from the controller.

16. The system of claim 12, wherein the EV cable management system is disposed proximate to the EV connection mechanism and attached to a portion of an external surface of the body, and wherein the EV cable management system comprises at least a non-charging receptable structured to receive the EV connector and a cable holster structured to hold the EV cable when the EV connector is not connected to the EV.

17. The system of claim 16, wherein the RV cable management system is disposed proximate to the RV connection mechanism and attached to another portion of the external surface of the body, and wherein the RV cable management system comprises at least a cable holder structured to hold the RV cable when the RV is not connected to the power receptacle.

18. The system of claim 12, wherein the EV comprises a land-based EV or a water-based EV.

* * * * *